Sept. 28, 1965    G. FALBEL    3,209,073
EXTREME WIDE ANGLE TELEVISION PHOTOGRAPHY
Filed Sept. 18, 1961    2 Sheets-Sheet 1

INVENTOR.
GERALD FALBEL
BY
ATTORNEY

Sept. 28, 1965 G. FALBEL 3,209,073
EXTREME WIDE ANGLE TELEVISION PHOTOGRAPHY
Filed Sept. 18, 1961 2 Sheets-Sheet 2

INVENTOR.
GERALD FALBEL
BY
ATTORNEY

United States Patent Office 3,209,073
Patented Sept. 28, 1965

3,209,073
EXTREME WIDE ANGLE TELEVISION PHOTOGRAPHY
Gerald Falbel, Stamford, Conn., assignor to Barnes Engineering Company, Stamford, Conn., a corporation of Delaware
Filed Sept. 18, 1961, Ser. No. 138,757
2 Claims. (Cl. 178—6.8)

This invention relates to extreme wide angle photography and more particular to such photography which utilizes television camera equipment.

Extreme wide angle photography, for example, such as is effected in the so-called "Cinerama" process has achieved marked commercial success. It produces a three dimensional illusion which is very striking. However, very serious problems have arisen because it is necessary to use multiple cameras and multiple projectors, (usually three are used). The problem of picture overlap or dividing lines has been extremely severe.

Another problem involving wide angled observation is that of side vision in airplane cockpits. In the ordinary commercial air liner the pilot can see out through only a very moderate angle forward. He cannot see very far to the side and, of course, cannot see toward the rear. This has caused problems and in fact was probably the main cause of the collision over the Grand Canyon which caused the loss of so many lives. When the pilot can see around a full circle such accidents can be prevented. The present invention solves this problem also but instead of requiring both a camera and a projector as is the case in extreme wide angle motion picture photography the picture is displayed continuously and immediately on a suitable kinescope. This type of presentation will be described below in connection with monitor kinescopes.

The present invention deals with the solution of the problem presented with only a single camera, and if necessary, with only a single projector. At the same time there are no limitations on the width of angle. The present invention permits photographing and projecting throughout a full 360°, though for many entertainment purposes only a portion of the full circle is utilized.

In order to achieve the results made possible by the present invention, a combination of optical elements and television cameras and projecting kinescopes are used. It is not new to use television cameras and kinescopes to photograph and reproduce objects and scenes. This is common practice when dealing with ordinary photography where the field angle is quite moderate. The procedure presents certain advantages. The camera can put out a signal which is recorded on tape and when high grade video tape is used, a high resolution is possible. This tape can be stored and reproduced for projection purposes indefinitely. It should be noted that there are two essentially completely separate and independent operations. The first is to transform, by means of a television camera, the scene into an electrical signal. The second, and independent operation is the recreation of the scene by means of kinescope which transforms the electrical signal back again into light. The two steps are completely separate and independent except that the nature of camera or projector must match. The recording procedure which transforms the scene into electronic signals can be either at once used to recreate it or it can be stored on magnetic tape or any other suitable means. In other words, one process can be used without necessarily using the other. The same is true of the present invention.

However, in using television camera and projector techniques, the instruments are used with a particular kind of optics and what is more important, with a particular kind of electronic scanning and marking in the camera and projector. The modifications used fly directly in the face of all good television standards. A new result is obtained by deliberately operating the instruments in a manner which is ordinarily considered undesirable.

The optical elements of the present invention are not in every case new elements, they have, however, never been used in conjunction with television equipment to produce the result of the present invention. Essentially, the optical element is a lens or reflector which can receive radiations around a whole horizon up to a moderate altitude. Typical optical elements are toroidal lenses, retrofocus lenses and reflective globes. In each case the rays coming from around the horizon are imaged by the optical element in the form of an annulus on the focal plane. According to the present invention the focal plane is the surface of a television camera tube, for example, an image orthicon. However, the face of the tube is treated in a new, and to skilled television engineers, a shocking manner. It is customary in television cameras to utilize as much as possible of the central portion of the camera tube. Problems with aberrations and other factors increase toward the periphery and so the edges or portions of them are normally utilized only to the extent that is absolutely necessary. Ideally the area close to the center of the camera tube should be used with a very moderate angle of sweep of the scanning electronic beam in the camera tube. In the present invention, however, all these standards of good television practice are deliberately disregarded and the central portion of the tube is black-out or masked off leaving only the normally undesirable annulus on which the annular image from the optical element is located. Scanning on the camera tube is effected by a spiral scan. This method of scanning is not unheard of in television camera tubes but it usually starts from the center, or near the center, of the tube face. In the present invention preferably the spiral scan covers as little as possible of the tube face not covered by the annular image. The spiral scanning circuits are conventional and no modification other than the limitation of the area scanned is involved. Since the circuits are standard they are not shown.

The electrical signal output from the camera tube, after suitable amplification and incorporation of the conventional timing pulses, blanking pulses, etc., can either be transmitted to a projector or to a direct view kinescope or it can be recorded on magnetic tape for future use. As the method of utilizing the signal either immediately or after storage is not changed by the present invention no limitation is placed thereon.

The projecting phase of the present invention receives an electrical signal corresponding to the output of the television camera tube. This, after suitable amplification and processing, is applied to a projection kinescope. The scanning circuits, of course, are spiral instead of rectangular in order to correspond to the scanning in the camera tube and the center of the projection kinescope is masked off in exactly the same way as was done with the camera tube. An annular picture is projected and this strikes an optical element which is essentially the same as in the camera and is projected horizontally around a horizon.

As has been pointed out above, the present invention permits recording and reproducing over a full 360° but it is not necessary that this full circle be utilized. For certain entertainment purposes such as cinerama-like performances, a semi-circle of somewhat less is adequate. Of course, in such a case the portion of the lens receiving unwanted material can be blocked off or the unwanted portion can be eliminated from the recording. For example, a portion of the annulus on the face of the camera tube can be masked or this can be done electronically by cutting off the signal during the unwanted portion of the spiral scan. In projecting, exactly the reverse procedure is followed either masking off a portion of the projecting lens or preferably of the projecting kinescope face.

Projection through the same type of optical path has been referred to and for public performance this is ordinarily desirable. However, it is by no means necessary.

For example, if it is desired to monitor the process, monitoring kinescopes may be used and the annular flat face of the tube may be viewed without retransforming the image into an erect cylindrical one along the horizon of a room. This is one of the reasons why it was pointed out above that the present invention involves two procedures which are not necessarily in any way interconnected. The photographic proceduure with a television camera, which transforms the scene into electrical signal must have both the optical elements and the specially constructed and operated television camera. Beyond this however, it is not necessary that all of the reproducing procedure be carried out. For example, a recorded tape is a useful article and the combination of this phase of the process ceases when the electrical signals have been transformed into a physically storeable form. The tape need not be used and if it is used it is not necessary that its signal be processed in the full projection equipment described above. The two procedures are entirely separate and the first may be used with or without part or all of the second procedure. This makes the present invention a very flexible one and it can be used in a number of different ways to suit the requirements of a particular operation.

It has been pointed out above that the present invention deliberately utilizes bad television recording and reproducing practice. However, it should be pointed out that in the present invention it is possible to obtain the new results of extreme wide angle recording projection without paying the full price in degradation of quality which might be expected. One of the reasons why television camera tubes and kinescopes are superior in their central portions is because in these portions the departure of a flat photosensitive area (or "target") which is practically necessary in camera tubes and kinescopes, makes for a minimum difference in path lengths of the electrons in the scanning beam in the camera and in the kinescope. Excessive difference in path length lead to defocusing and other electro-optical problems. In the present invention, it is possible to focus the scanning beam in both camera and reproducing kinescope for the middle of the annulus and if the annulus is not too wide in comparison to its circumference it is possible to achieve a surprisingly high quality which does not suffer too greatly in comparison with the quality obtained in utilizing the central portion of the tubes. In the present invention, therefore, care should be taken to focus for maximum sharpness in a more or less central circle of the annulus, and when care is taken to adjust focus properly, the final result is a high-grade picture which will normally compare very favorably with the best television standards.

The present invention, which is capable of recording over a full 360° lends itself to a greater degree than conventional motion picture photography or even Cinerama for presenting novel effects. If the camera is swung somewhat from vertical, an extreme tilting illusion is produced and so many very striking effects can be obtained. However, this also requires that a certain amount of care be exercised because the effects of tilt are more pronounced than in a narrow angle view camera. It is important for a normal recording where special effects are not desired, that the camera be kept vertical. This is easy to achieve but care must be taken.

It should be noted that the present invention has an important advantage over ordinary photography, since the instrument can record over a full circle and it is ordinarily not necessary to move the camera at all and the necessity for great smoothness and considerable slowness in panorama shots is no longer a problem.

This will be described in greater detail in conjunction with the drawings in which.

Figure 1:
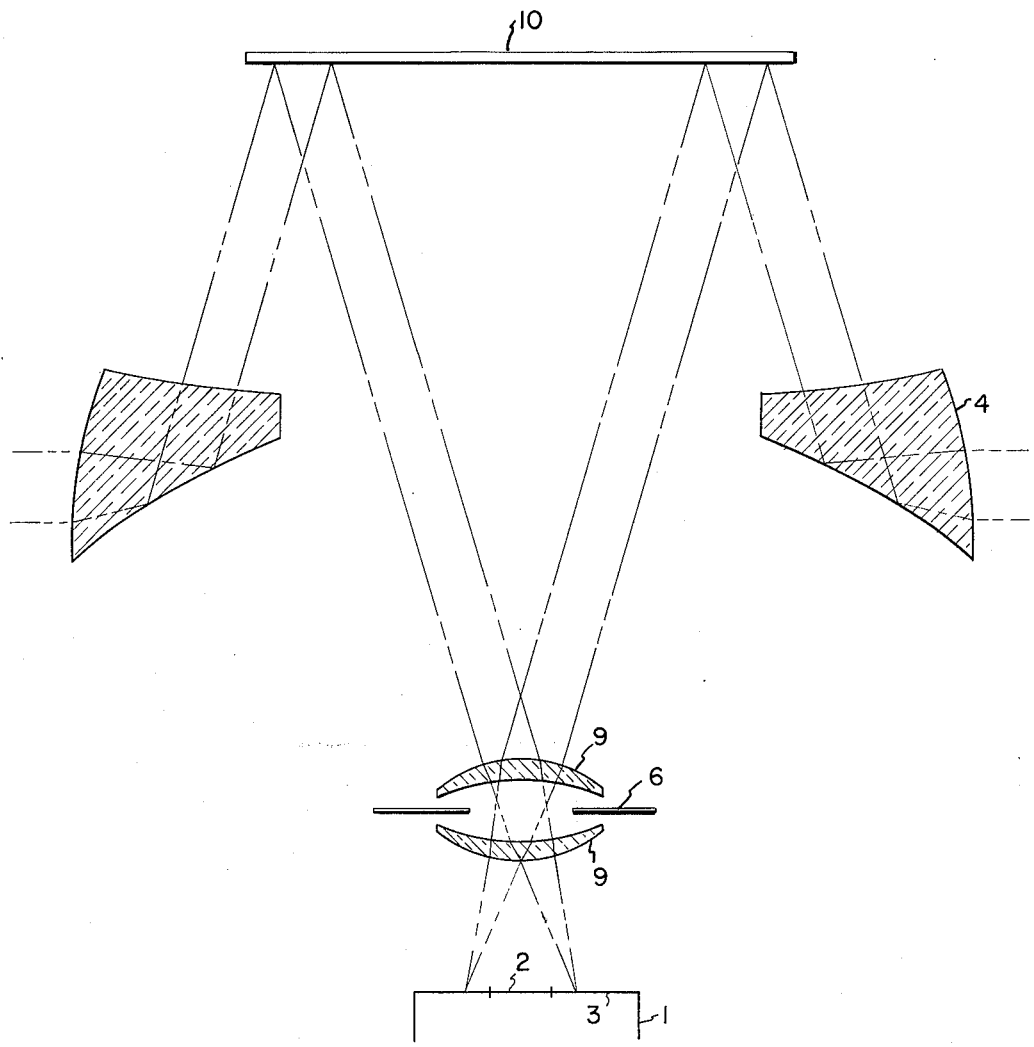
FIG. 1 illustrates a diagram using a toroidal lens in conjunction with a vidicon camera tube.

In all of the figures the television tube is shown at 1 with a masked off central portion 2 and an exposed annulus 3. In FIG. 1 a toroidal lens 4 is mounted above the tube face, the incoming rays are reflected and refracted up and strike a plane mirror 10 which reflects them down through the central opening of the toroidal lens and through the lenses 9 which focus the rays on the annular portion 3 of the camera tube. An aperture stop 6 is also provided and is shown as fixed although it may, of course, be adjustable. The lens is entirely symmetrical and so can view a full 360°.

The electron beam in the tube is preferably scanned spirally by conventional spiral scanning circuits which are not shown. An output signal is produced corresponding to a spiral scan of the annular image with the conventional scanning information in pulse form superimposed thereon. As the recording phase of the invention ceases when the electrical signal is produced it can be used in any suitable manner and therefore conventional tape recorders, correcting circuits, television transmitters and the like are not shown as they are not changed from their standard design by the present invention.

When it is desired to project the scene, the procedure is reversed. The tube 1 is now a projection kinescope and the bright annular image is projected as a cylindrical band on a cylindrical screen. FIG. 1 shows the rays for the camera tube but, of course, the optical system is completely reversible for projection purposes.

FIG. 1 is diagrammatic, details of the camera phosphor are therefore not shown, as they are not changed by the invention and it is possible to record either in color or black and white using ordinary masking techniques. Similarly, the projection tube can project in black and white or in color. Especially for projection purposes there is an advantage in having the necessary color masking spiral instead of rectangular.

Figure 2:
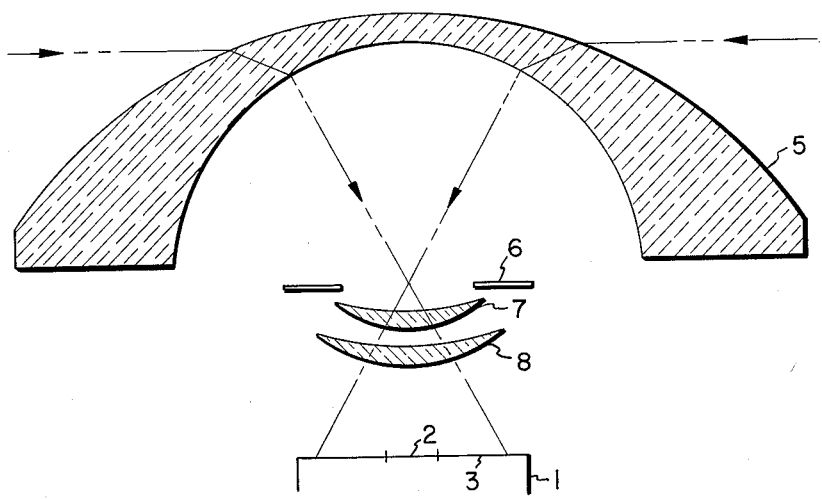
FIG. 2 is a similar diagram with a retrofocus lens.

FIG. 2 shows the same television tube, but now instead of a toroidal lens a retrofocus lens 5 is used with an aperture stop 6 which bears the same number as in FIG. 1 but the lenses are different in design and shape and are shown at 7 and 8. These lenses instead of imaging what is initially collimated light in FIG. 1 are correcter lenses which correct for the aberrations of the retrofocus lens and are in the form of slightly curved meniscus lenses. An annular image is produced on the face of the tube just as in FIG. 1 and, of course, is processed in the same manner. Projection also results in the same way as in FIG. 1.

Figure 3:
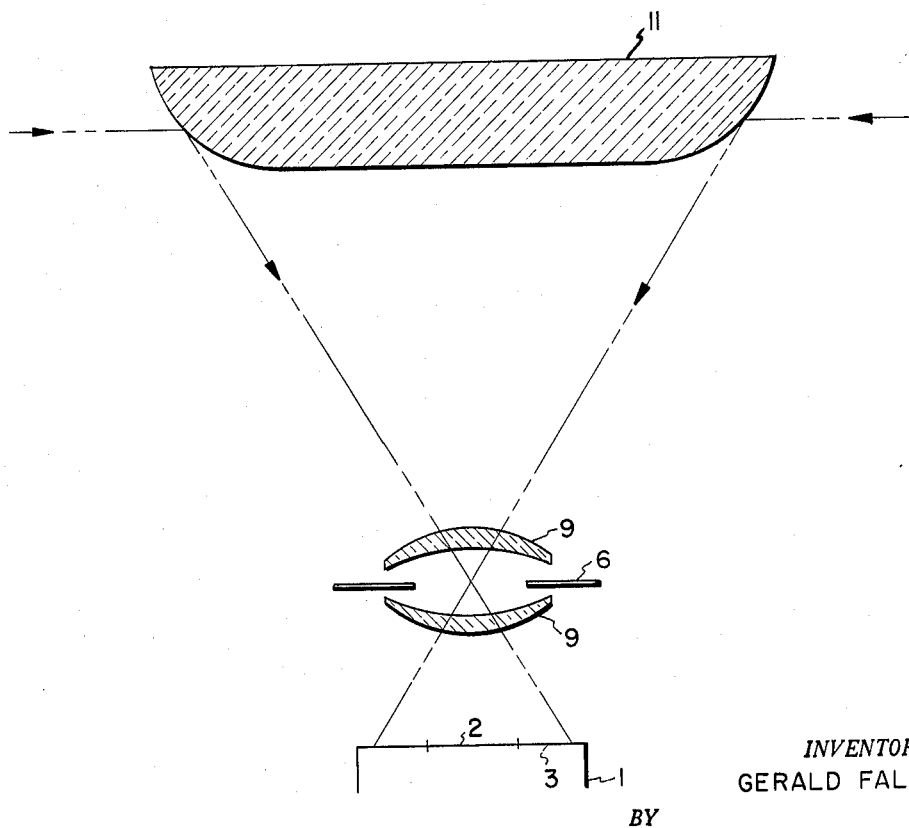
FIG. 3 is a similar view using a reflective globe.

FIG. 3 shows a catadioptric system using a portion of a sphere 11 as a reflecting mirror with correcting lenses 9 to remove spherical aberrations. The aperture stop 6 is located between the corrector lenses. Again the image is on an annulus on the television tube and a similar annular picture can be projected from a projection kinescope.

In the three figures different optical elements have been shown. However, they are interchangeable. Thus the toroidal lens of FIG. 1 presents some advantage from a manufacturing standpoint. It should be clear, of course, that it is not necessary to use the same optical element in the projecting system as in the recording system. One may have one type and the other may have a different one.

When used for motion picture purposes the same kind of radiation will be used in both the recording and the projecting systems. This, however, is not necessary. It is perfectly possible to use a different kind of radiation in the recording for example, this may be infrared radiation in which case an infrared or heat picture is obtained. This may be projected with visible light from a projection kinescope and presents advantages over ordinary infrared cameras because scanning speed is enormously increased. It is necessary, of course, to use a special infrared camera tube.

I claim:
1. A system for transforming into electrical signals optical radiations from a scene extending around at least a large fraction of a full circle, comprising in combination,
  (a) a television camera tube having the central portion masked off,
  (b) means for imaging optical radiations from the scene onto the exposed annulus of the television camera tube, and
  (c) means for spirally scanning the annulus of the camera tube with a spiral covering substantially only the annulus and leaving the masked off central portion of the camera tube substantially unscanned whereby the image on the unmasked annulus is transformed into electrical signals.

2. A projection device comprising in combination,
  (a) a kinescope, the center of which is masked off,
  (b) means for deflecting the electron beam of the kinescope spirally over the annular portion of the kinescope face which is not masked off, said deflecting means producing an electron beam scan which does not substantially extend onto the masked off portion, and
  (c) optical means for projecting the annulus on the kinescope into a horizontal image extending around at least a large fraction of a full circle whereby the annular image on the kinescope can be projected onto a cylindrical screen.

References Cited by the Examiner

UNITED STATES PATENTS

| | | | |
|---|---|---|---|
| 1,616,279 | 2/27 | Parodi | 88—5.7 |
| 2,146,662 | 2/39 | Van Albada | 88—57 |
| 2,312,954 | 3/43 | Bown | 178—7.2 |
| 3,040,123 | 6/62 | Hellings | 178—6 |

DAVID G. REDINBAUGH, *Primary Examiner.*

ROY LAKE, *Examiner.*